United States Patent [19]
Seiver

[11] Patent Number: 6,053,219
[45] Date of Patent: Apr. 25, 2000

[54] APPARATUS AND METHOD FOR FILLING CONTAINERS WITH LIQUID

[76] Inventor: Michael J. Seiver, 3002 Shadowdale, Houston, Tex. 77043

[21] Appl. No.: 09/292,570

[22] Filed: Apr. 16, 1999

[51] Int. Cl.[7] ...................................................... B65B 1/04
[52] U.S. Cl. ............................................ 141/83; 141/374
[58] Field of Search ............................. 141/83, 192, 198, 141/87, 86, 374

[56] References Cited

U.S. PATENT DOCUMENTS

| | | | |
|---|---|---|---|
| 4,350,186 | 9/1982 | Schalkowsky et al. | 141/83 |
| 5,431,200 | 7/1995 | Mariotti | 141/83 |

*Primary Examiner*—Steven O. Douglas
*Attorney, Agent, or Firm*—Bill B. Berryhill

[57] ABSTRACT

Apparatus and method for filling containers with liquid utilizing apparatus of the type having a tubular filling lance operatively connected to a source of liquid and being vertically movable between raised and lowered positions, raising and lowering of the lance being controlled so that the lower emission end of the lance is disposed just below the surface of liquid in the container as the container is being filled through the lance. The apparatus comprises: first and second control valves, each having actuators, providing fluid communication between the source of liquid and the tubular filling lance; a weight measuring device for real time measurement of the weight of liquids placed in a container through the tubular filling lance; and controls operatively connected to the weight measuring device and each actuator of the first and second control valves for controlling the movement of the first and second control valves and the flow of liquids through the tubular filling lance into the container in response to predetermined weight of liquids in the container.

25 Claims, 5 Drawing Sheets

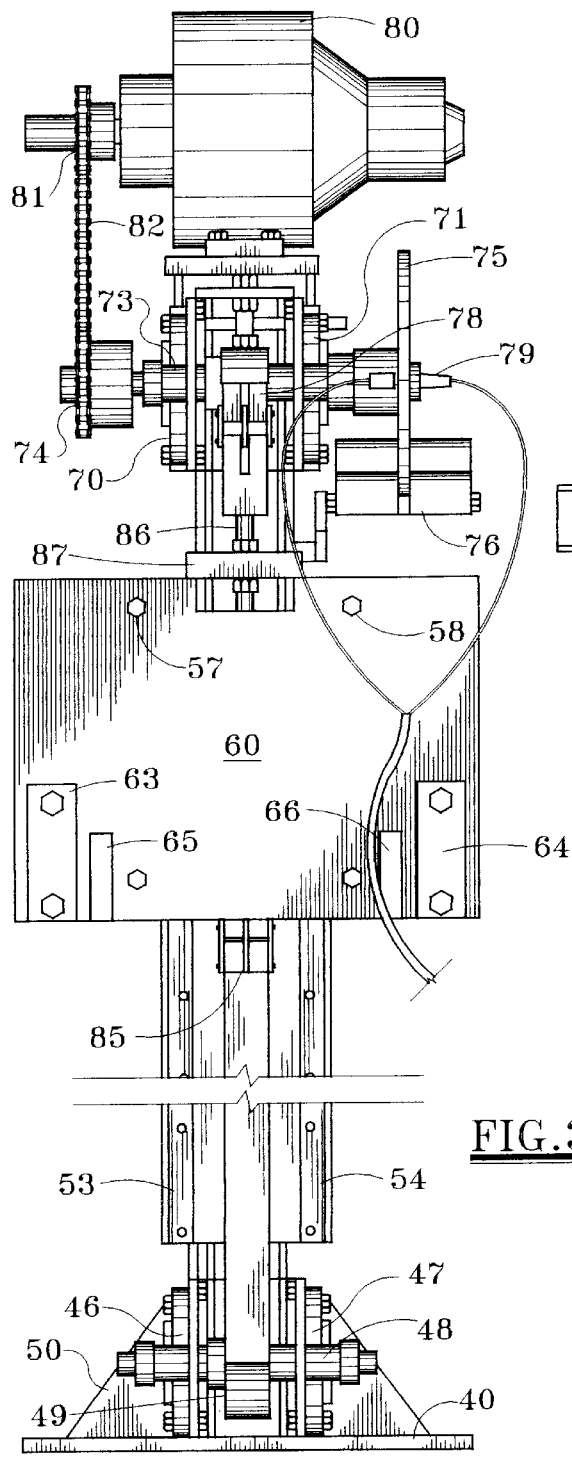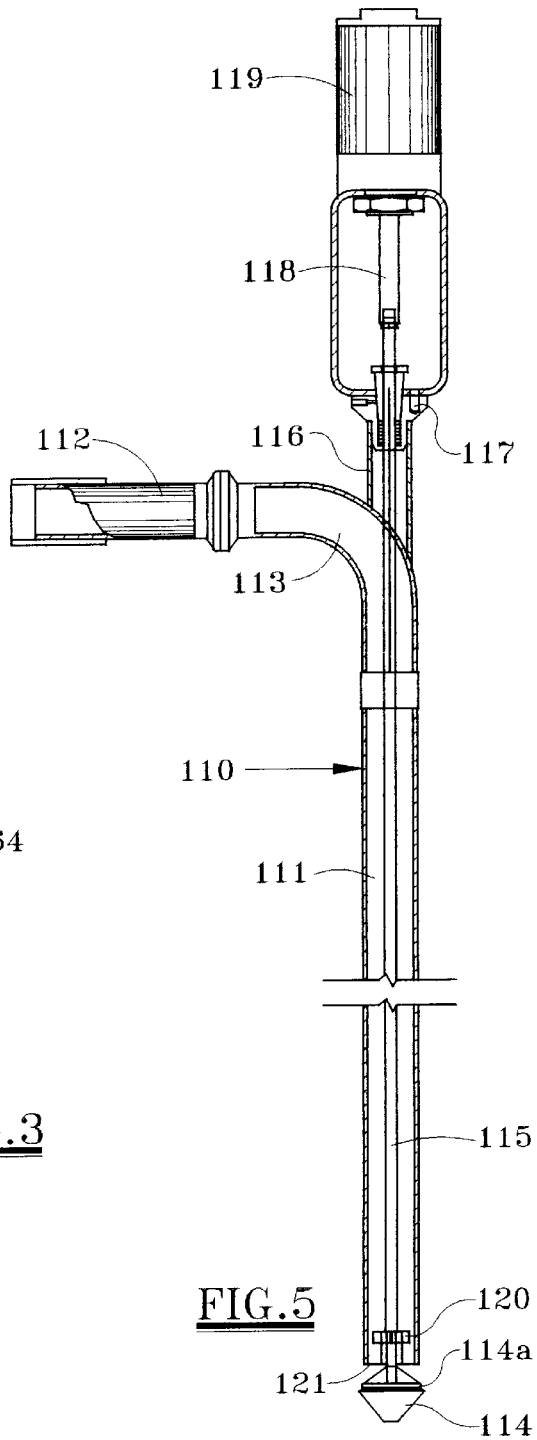

APPARATUS AND METHOD FOR FILLING CONTAINERS WITH LIQUID

1. FIELD OF THE INVENTION

The present invention pertains to apparatus and methods for filling containers with liquid. More specifically, the present application pertains to apparatus and methods for filling containers having a tubular filling lance operatively connected to a source of liquid and being vertically moveable between raised and lowered positions to fill the container with a predetermined weight of liquid.

2. DESCRIPTION OF THE PRIOR ART

There are a number of apparatuses and methods utilized to fill containers with predetermined amounts of liquid. One of the most successful and efficient type of liquid filling apparatus has a tubular filling lance operatively connected to a source of liquid which is vertically moveable between raised and lowered positions. The lance is positioned above an opening in the container and lowered into the container for filling thereof. After the container is filled the lance is returned to its fully raised position.

In the case of liquid susceptible to foaming, it is typically the practice to first lower the lance into the container to a predetermined position just above the bottom of the container. Fluid is introduced into the container until the lower end of the lance is submerged below the surface of the liquid. The flow of liquid into the container continues, sometimes at a faster fill rate, while the lance is simultaneously raised with its lower end submerged just below the surface of the liquid, until a predetermined amount or weight of liquid is in the container. Then the lance is raised to an uppermost raised position, out of the container, allowing the filling opening to be plugged and the filled container to be further handled for shipping and/or storage.

Some of the primary reasons for keeping the lower end of the lance slightly submerged below the surface of the liquid, as it is being introduced into the container is to minimize product contact with air, to reduce static electric charges and to prevent foaming and splashing. Foaming and splashing may result in less accurate and efficient measuring of the liquids and may creator additional fumes or vapors which might be more difficult to dispose of. Another reason for keeping only a small portion of the lance emersed in the liquid during the filling operation is wetting of the lance with quick setting liquids making it difficult to remove excess material therefrom and difficult to determine the final weight in the container since a substantial amount may drip from the lance after it is removed from the container. Even in apparatus and methods in which only the lower end of the lance is submerged in the liquid, wiper rings and drip collectors are frequently provided to alleviate this problem.

Even though recent prior art apparatus for filling containers with liquid of the type having a tubular filling lance which is vertically moveable between raised and lowered positions is much more desirable than methods and apparatus prior thereto, the container filling industry would be very receptive to apparatus and methods which would result in quicker and more efficient filling of the containers. A single example will illustrate this point. In the most modern liquid filling machines of the prior art, liquid first flows into the container at a slow or "dribble rate". This occurs for a relatively short period of time until the lower end of the lance is submerged in the liquid. Then the control valve is fully opened and liquid flows into the container at a much higher or "fast fill rate" as the lance is raised while doing so.

As the liquid in the container approaches the final weight, say 90% thereof, the control valve is closed. Then it is reopened to a partially opened or dribble rate position for the final filling of the container. When the final weight is reached, it is again closed. Of course, some time elapses between the closing and reopening of the control valve. In addition, closing the control valve to terminate the fast fill, sometimes results in hydraulic hammer. Obviously, loss of time and hydraulic hammer are not desirable. Any improvements which would eliminate these problems would be looked upon with favor.

SUMMARY OF THE PRESENT INVENTION

The present invention also provides apparatus for filling containers with liquid and is of the type which has a tubular filling lance operatively connected to a source of liquid and which is vertically moveable between raised and lowered positions. In a preferred embodiment, the apparatus of the present invention provides a first control valve in fluid communication with the source of liquid which includes an actuator for moving the first control valve between a fully opened position and a partially opened position. It also includes a second control valve disposed between the first control valve and the filling lance which also includes an actuator for moving the second control valve between a fully opened position and a completely closed position.

The apparatus includes a weight measuring device for real time measurement of the weight of liquids placed in the container. In addition, control elements are operatively connected to the weight measuring device and each actuator of the first and second control valves for controlling movement of the first and second control valves and the flow of liquids through the filling lance into the container in response to predetermined weight of liquids in the container.

The control elements position each actuator of the first and second control valves for three different rates of flow: fast fill, slow or dribble fill and no fill. Both of the control valves are fully opened during fast fill, the first control valve is partially opened and second control valve is fully Opened during slow fill, and the first control valve is partially opened and the second control valve completely closed during no fill. These valves may be positioned in sequence as required. For example, a slow fill-fast fill-slow fill-no fill sequence helps eliminate foaming and fumes.

The apparatus would normally include a third control valve associated with the emission end of the filling lance and including an actuator for moving the third control valve between opened and closed positions. The control elements are also operatively connected to the actuator of the third control valve to open it during fast and slow fill rates and close it during no fill.

In preferred embodiments, the apparatus of the present invention is further characterized by a fume housing for positioning above the fill opening of a container into which liquid is to be dispensed. The housing provides a vertical opening therethrough through which the filling lance may be lowered into and raised from the container. The housing may be provided with one or more apertures through which fumes from liquids flowing into the container may be drawn for proper disposal and may also be equipped with a drip pan which is retracted therein as the lance is being lowered into or raised from the container but which is provided with a reciprocating actuator which will move the drip pan beneath the emission end of the lance when the lance is in its uppermost and closed terminal position to collect any liquids dripping therefrom.

In a preferred method of utilizing the apparatus of the present invention, the lance is positioned above an opening in a container and lowered into the container to a predetermined position just above the bottom of the container. The control valves are opened to introduce liquid into the container and the lance is simultaneously raised, its lower end being submerged just below the surface of the liquid, until a predetermined weight of liquid is in the container. Then at least one of the control valves is partially closed to reduce the flow rate to a dribble fill rate until a predetermined target net weight of liquid within the container is reached. At least one of the first and second control valves is then completely closed to terminate the flow from the source of liquid. In a preferred method, the third control valve associated with the lance is also closed, after a short time delay, and a collection tray with drip pan is moved beneath the emission end of the lance to collect any excess liquid dripping therefrom.

One of the primary advantages of the apparatus and method of the present invention is in transition from fast fill rates to dribble fill rates. By providing two control valves one of which is either partially opened or fully opened at all times, it is not necessary to completely close and partially reopen a valve to move from fast fill to dribble fill. This eliminates loss of time and hydraulic hammer. The apparatus of the present invention is also provided with a number of improved features including air motor driven gear reducers, air operated disc brakes and improved position indicators. This results in better control of lance tracking, speed, accuracy, reduced foam and minimum fume or vapors. Many other objects and advantages of the invention will be apparent upon reading the description which follows in conjunction with the accompanying drawings.

BRIEF DESCRIPTION OF THE DRAWINGS

FIG. 3 is a side view of a mast assembly of FIG. 2;

FIG. 5 is an elevation view, in section, of a lance assembly which makes up a portion of the filling apparatus of FIG. 1.

DESCRIPTION OF PREFERRED EMBODIMENTS

Figure 1:
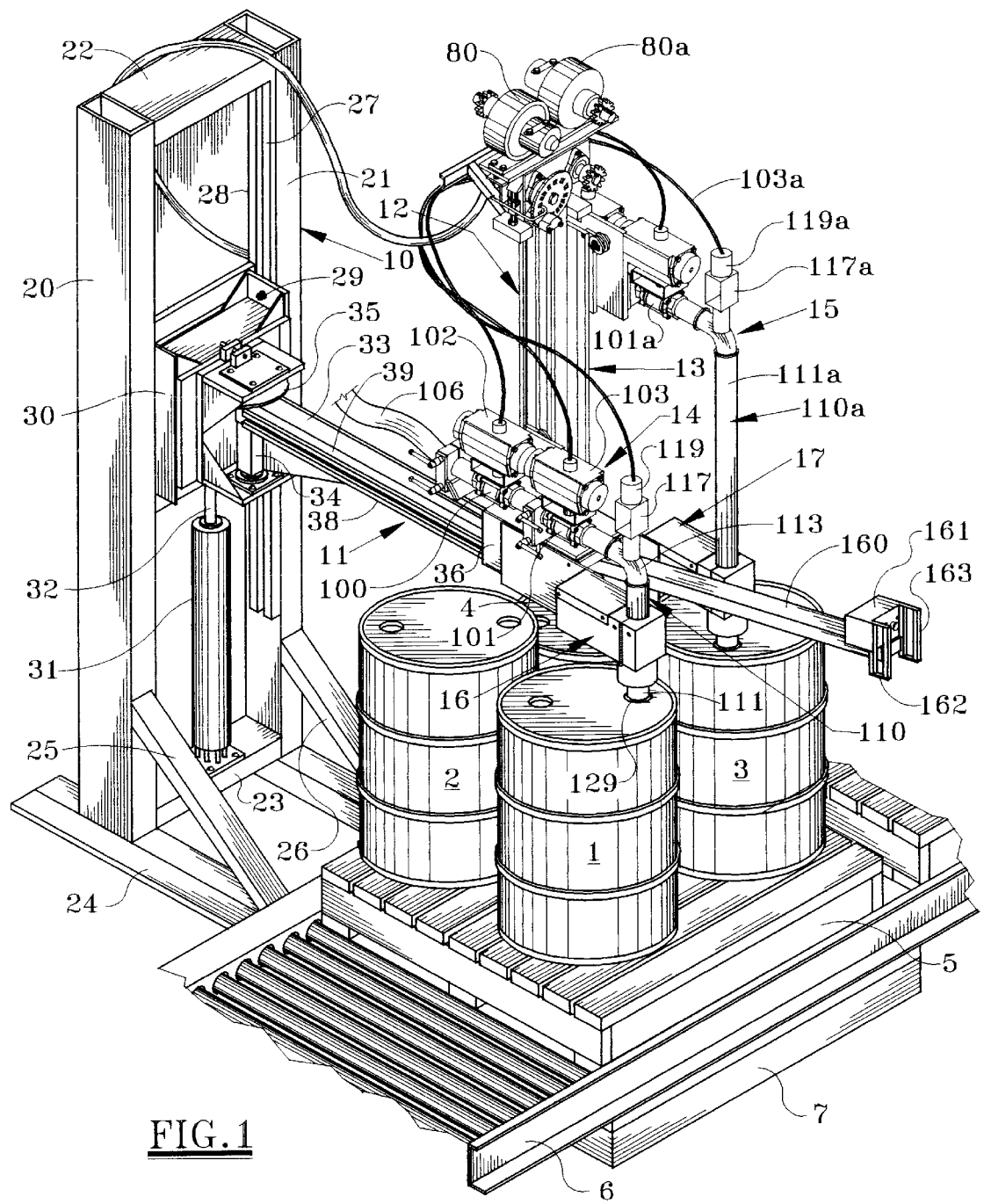
FIG. 1 is a perspective view of filling apparatus of the present invention, according to a preferred embodiment thereof, shown positioned for filling one or more fluid containers placed on a pallet for further handling thereof.

Referring first of FIG. 1, there is shown apparatus, according to a preferred embodiment of the invention, for filling containers with liquid. In FIG. 1, the containers represented are drums 1, 2, 3 and 4. The drums are shown resting on a pallet 5. A scale 7 is provided below the pallet 5 and conveyor 6 to weigh the drums and their contents. The pallet 5 is supported for movement on the conveyor 6. Although portions of the conveyor 6 are shown, the conveyor is not new and forms no part of the invention. However, it is understood that the conveyor 6 is utilized to move pallets 5 and drums 1–4 thereon from place to place. For example, the empty drums 1–4 would have been placed on a pallet 5 and moved on the conveyor 6 to a position and a predetermined relationship with the filling apparatus. After the drums 1–4 are filled, the pallet 5 and the filled drums 1–4 would be moved to loading or storage positions.

In the embodiment shown the filling apparatus comprises several assemblies and/or subassemblies. It may comprise a stanchion or support assembly 10, a horizontal arm assembly 11, a pair of vertical mast assemblies 12 and 13, a pair of control valve and lance assemblies 14 and 15 and a pair of vapor or fume assemblies 16, 17. The purpose of the apparatus is, of course, to fill containers, such as the drums 1–4, with liquid. The apparatus and method for doing so will be now more fully described.

In the exemplary embodiment, the extension or support assembly 10 comprises a pair of vertical structural members 20, 21 connected by horizontal structural members 22, 23. These members rest on a base 24 and may be further reinforced by angle support members 25, 26. Each of the vertical support members, 20, 21, are provided with a pair of inwardly facing rails, such as the rails 27 and 28 of support member 21. A carriage assembly 30 is disposed between the vertical members 20 and 21 for vertical upward and downward movement therein. The carriage assembly 30 is guided between the rails by upper and lower wheels or rollers (not shown) which are attached to opposite sides of the carriage assembly 30 for rolling movement between the rails 27, 28 and like rails facing inwardly from vertical member 20. The end of a shaft 29 supporting one of the upper wheels or rollers of the carriage assembly 30 is shown in FIG. 1. There would be at least one other roller beneath the roller attached to shaft 29 and a corresponding pair of rollers on the opposite side of the carriage assembly 30 engaging the rails (not shown) on the inner side of the vertical support 20. A hydraulic or air operated ram or piston/cylinder assembly 31 is shown mounted between the horizontal support member 23 and the carriage assembly 30. Extension and retraction of the rod 32 of the ram 31 would be used to position the carriage assembly 30 and other components of the apparatus attached thereto to raise or lower portions of the apparatus as required.

The horizontal arm 33 of the arm assembly 11 is attached, at its proximal end, by a pivot assembly 34 which allows the arm 33 and arm assembly 11 to pivot about a vertical axis for radial movement of the mast assemblies 12, 13, the control valve and lance assemblies 14, 15 and the fume assemblies 16, 17 about this vertical axis. The disc 35 of a disc brake is attached to the proximal end of the arm 33. A corresponding disc brake actuator (not shown) is attached to fixed support portions of the pivot assembly 34. The disc brake may be utilized to hold the arm assembly 11 is a fixed radial position.

As previously stated, the exemplary embodiment comprises a pair of vertical mast assemblies 12, 13. Each of these mast assemblies 12, 13 are mounted on an arm carriage 36 which is attached to the arm 33 for horizontal movement thereon. The horizontal arm carriage 36 is provided with inwardly directed wheels or rollers which are disposed or positioned between horizontal rails, e.g. 38, 39, mounted on opposing sides of the arm 33, the rails 38 and 39 providing guidance for the rollers of the horizontal carriage 36.

Figure 2:
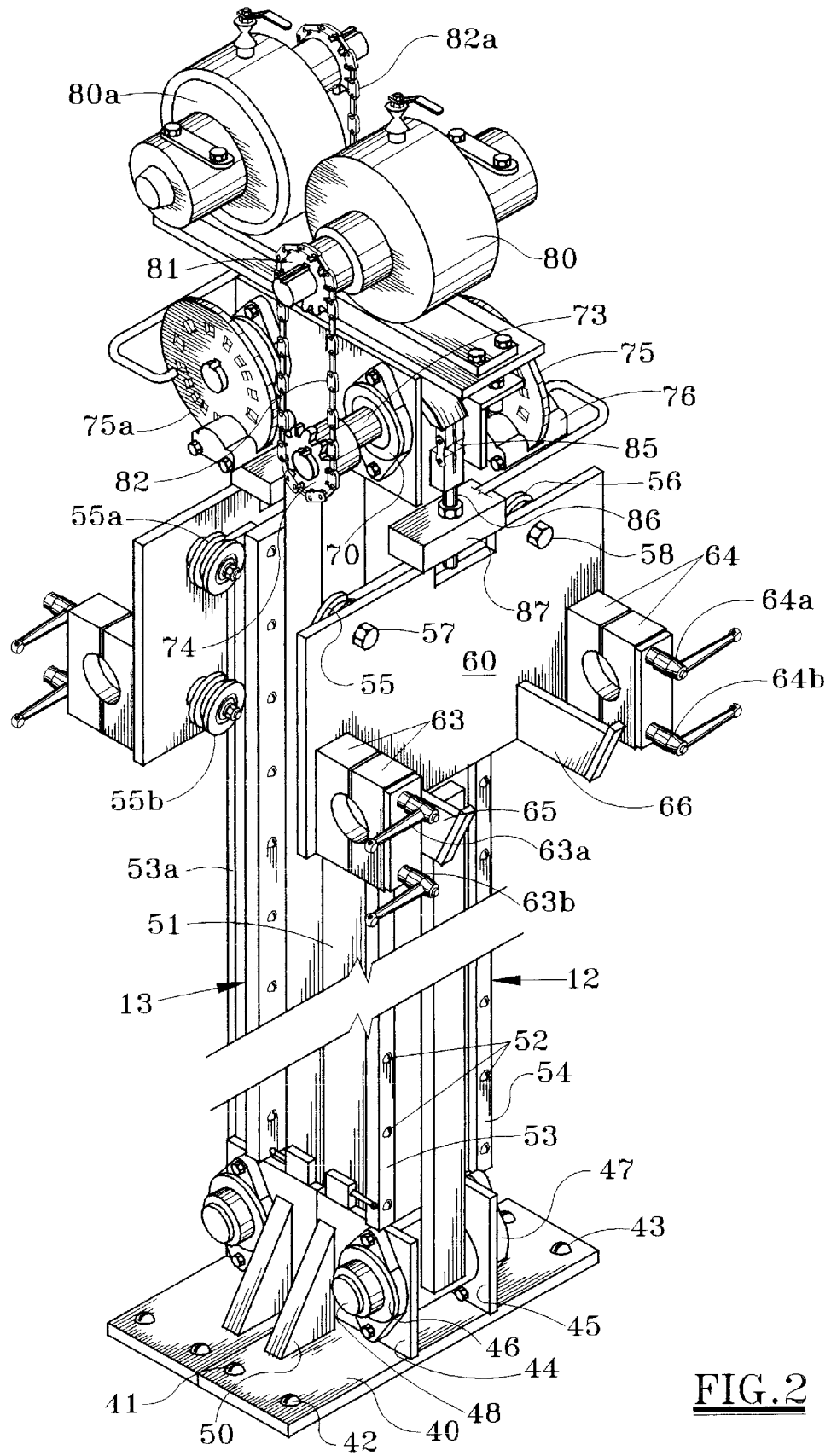
FIG. 2 is a perspective view of a vertical mast assembly which makes up a portion of the filling apparatus of FIG. 1.

For a better understanding of the vertical mast assemblies 12, 13, reference may also now be made to FIGS. 2 and 3 which show, primarily, the mast assembly 12 in greater detail. For better understanding and illustration of the mast assemblies, the control valve and lance assemblies 14 and 15 have been removed. The mast assembly 12 may comprise a base plate 40 which may be attached to the previously mentioned horizontal arm carriage 36 by bolts or screws 41, 42, 43 placed through holes provided therefor. See also FIG. 5. A pair of vertical plates 44, 45 support bearings 46, 47 which in turn support the ends of a shaft 48 to which is attached a chain sprocket 49. Additional support gussets 50 may be welded to the plates 44, 45 and the base plate 40.

Extending upwardly from the base plate 40 and the bearing support plates 44 and 45 is a vertical support column 51 to which is attached by screws or other type of fasteners 52 a pair of rail members 53, 54 the outer edges of which are V-shaped. Engaging the V-shaped edges of the rails 53, 54 are upper and lower pairs of v-type rollers. The upper pair 55 and 56 are seen in FIG. 2. See the corresponding V-shaped rail 53a and upper and lower rollers 55a, 56b of the mast assembly 13. Studs 57 and 58 connect the shafts on which the rollers 55, 56 rotate to a plate 60 which makes up a part of a mast carriage assembly which is mounted for up or down movement on the mast 12. A lower pair of rollers such as 55b (not shown) are also attached to plate 60 by studs. These V-shaped rollers 55, 56, etc. engage and ride on the corresponding V-shaped edges of the rails 53 and 54 as the mast carriage assembly moves up and down thereon. A pair of split mounting blocks 63, 64 connected by threaded connectors 63a, 63b, 64a, 64b are attached to the plate 60 and form a part of the mast carriage assembly. A pair of support elements 65, 66 may also be attached to the plate 60. Their purpose will be more fully understood hereafter.

Mounted at the upper end of the mast assembly 12 is a pair of bearing assemblies 70, 71 which support a rotating shaft 73 at one end of which is a sprocket 74 and at the opposite end of which is a disc 75 which forms at least two functions. The disc 75 may form the disc portion of a disc brake which cooperates with a disc brake actuator 76, in selective engagement or disengagement stopping or allowing rotation of the shaft 73. The disc 75 may also be provided around the periphery thereof with apertures or other indicia which will indicate certain movements of the apparatus and in particular the vertical mast carriage 60 and other components attached thereto. Mounted at the uppermost end of the mast assembly 12 is an air gear motor 80, on one end of the shaft of which is mounted a driving sprocket 81. The driving sprocket 81 is connected by sprocket type chain 82 to the driven sprocket 74 attached to the shaft 73. Mounted on the shaft 73 intermediate the driven sprocket 74 and the disc 75 is an intermediate sprocket 78. See FIG. 3. The intermediate sprocket 78 is engaged by a sprocket chain 85, an end element 86 of which is fixedly attached to the mast carriage assembly 60 by a block 87. The chain runs over the sprocket 78 down the vertical mast assembly 12 around the lower sprocket 49 and its opposite end is affixed in any suitable manner to the lower edge of the mast carriage assembly 60.

The air motor gear reducer 80 can rotate in either direction. It can be understood that rotation of the air motor gear reducer 80 will, through engagement of its sprocket 81 with chain 82 and the driven sprocket 74, cause rotation of the shaft 73 and the intermediate sprocket 78. The sprocket 78 which engages the chain 85 will rotate causing the chain 85 to raise or lower the mast carriage 60 depending on the direction of rotation of the air motor gear reducer 80.

Figure 4:
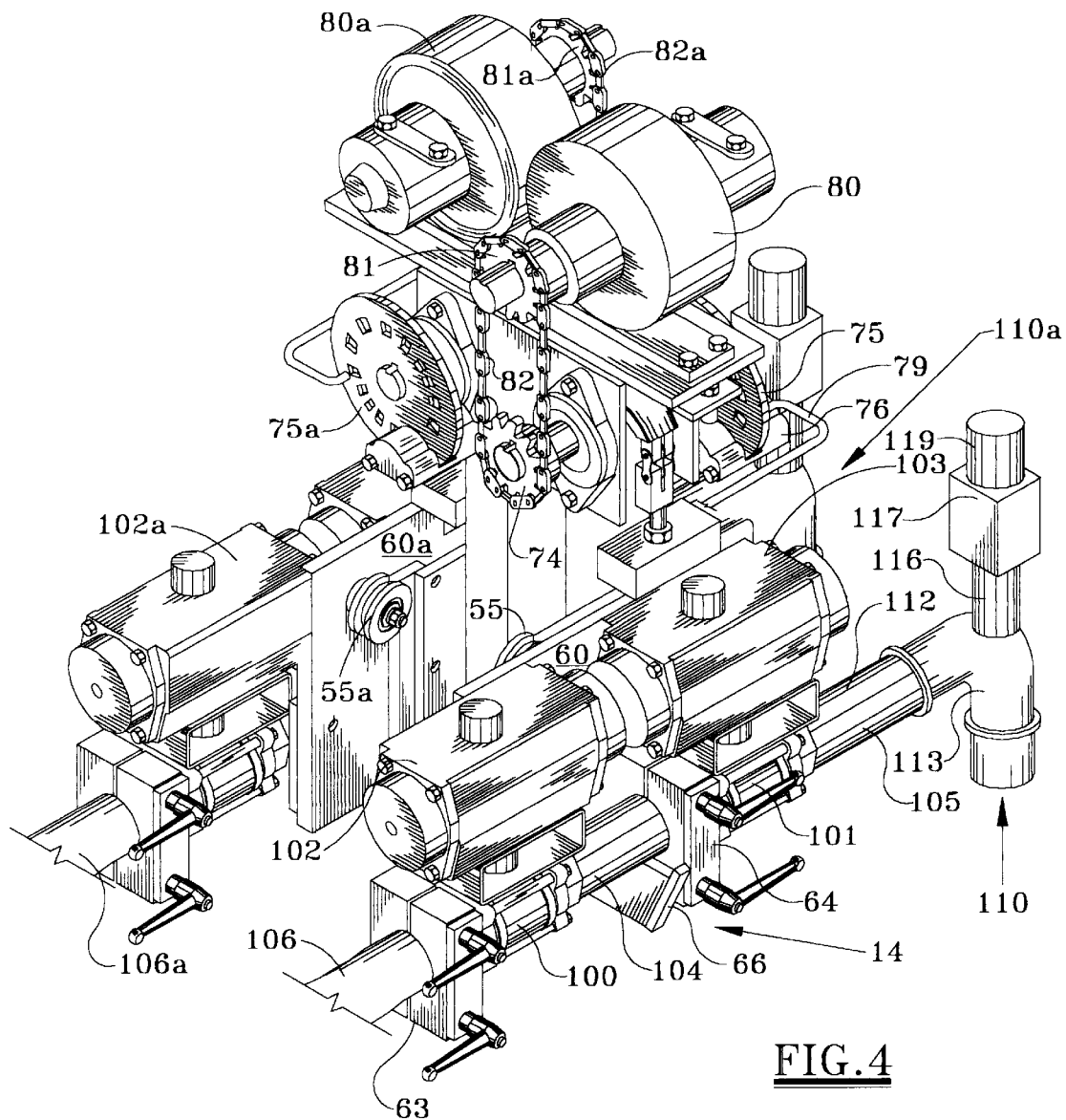
FIG. 4 is a perspective view of a portion of the filling apparatus of FIG. 1 drawn to a larger scale for a clearer understanding thereof.

Referring now also to FIG. 4, a portion of the vertical mast assembly 12 is shown. FIG. 4, like FIG. 1, shows the mast assembly with the control valve and lance assemblies 14, 15 attached thereto. The carriage plate 60 (See FIG. 3) supports the control valve and lance assembly 14 and a corresponding plate 60a supports the control valve and lance assembly 15. As can be seen, there are two mast assemblies 12, 13 and two control valve and lance assemblies 14, 15. They are essentially mirror images of each other and are independently operated. This allows use of a part of the apparatus, for example a left hand side for filling of one product and another side, for example, the right hand side for filling containers with another product preventing cross-contamination between these products. Most of the detailed description of the apparatus of the present invention refers to the one side thereof. However, as stated, the other side is essentially a mirror image thereof.

Attached to the plate of the carriage 60 are a pair of control valves 100, 101 and corresponding valve actuators 102, 103 and connecting nipples or conduits 104, 105. Conduits 104 and 105 are engaged by the support blocks 63, 64 holding the control valves in place. The first control valve 100 is in fluid communication, through a supply hose or conduit 106 to a source of liquid (not shown). The activator 102 is capable of moving the first control valve 100 between a fully opened position and a partially opened (or partially closed) position.

The second control valve 101 is disposed between the first control valve 100 and a tubular filling lance assembly 110. The activator 103 is for moving the second control valve 101 between a fully opened position and a completely closed position. The lance assembly 110 (best seen in FIG. 5) includes a vertical tubular member 111 which is connected to the second control valve 101 through a nipple 112 and elbow 113. The lance assembly 110 includes at the lower end thereof a third control valve which in the exemplary embodiment includes a foot valve or closure member 114 with O-ring 114a attached to a rod 115 which extends upwardly through the tubular member 111, a tubular extension 116 on the upper side of the elbow 113 and a seal assembly 117 for engagement by the rod 118 of an air operated piston 119. A guide member 120 within the lower end of the tubular member 111 keeps the lance closure member 114 and O-ring 114a centered as they move from an opened position (as shown in FIG. 5) to a closed position, sealing against a seat 121, in response to operation of the actuator 119.

Figure 6:
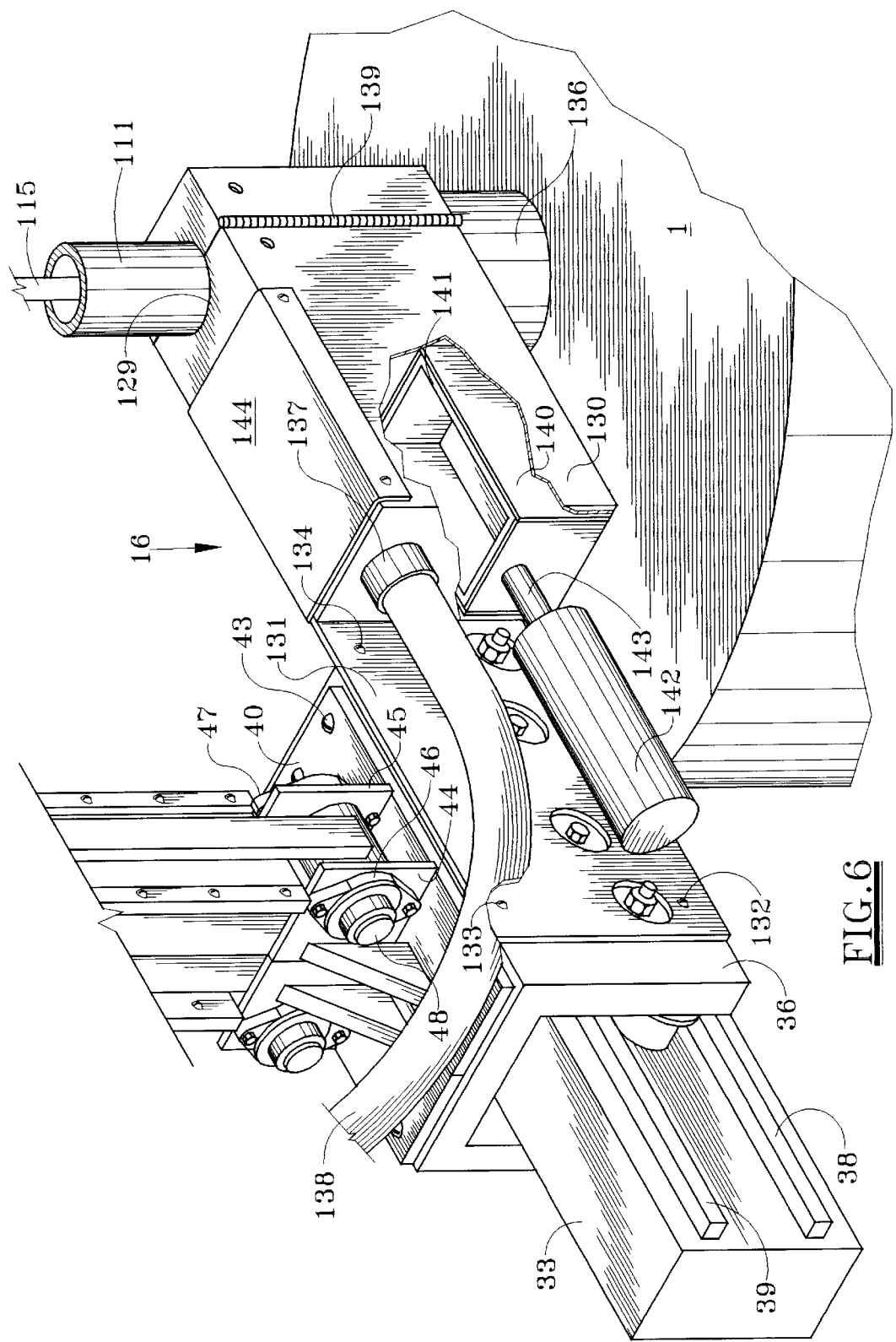
FIG. 6 is a perspective view of a fume housing and which makes up a portion of the liquid filling apparatus of FIG. 1, portions of which have been cut away to illustrate the operation thereof.

As best seen in FIGS. 1 and 6, the tubular member 111 of lance assembly 110 engages a vertical opening 129 through the housing 130 of the fume or vapor assembly 16. The housing 130 of the fume assembly 16 is attached to a plate 131 which, in turn, is attached by screws 132–134 to the horizontal carriage assembly 36 mounted on the arm 33. Holes are provided in the plate 131 to accommodate the heads or nuts of bolts and/or studs projecting from the side of the carriage assembly 33. Surrounding the upper opening 129 of the housing 130 is a wiper ring (not shown) which is engageable with the lower end of the lance 110 to wipe any liquids off the lance 110 as it is raised from a lowered position. Extending downwardly from the housing 130 and concentrically aligned with the upper opening 129 is a tubular member 136 which surrounds the opening of the container (drum 1) being filled by the apparatus to allow any vapors or fumes therefrom to enter the housing 130. The rear of the housing is provided with an aperture 137 to which a hose or conduit 138 may be attached for drawing off any vapors or fumes in the housing 130 for eventual disposal.

One end of the housing is split and hingedly attached at 139 allowing the end of the housing 130 to be opened up so that the lance 110 may be removed and/or replaced without having to disconnect other components of the apparatus.

Carried within the housing 130 is a drip pan tray 140 retracted therein away from the lance 110 as it is lowered into or raised from a container. A disposable drip pan 141 is placed within the tray 140. However, if the lance tube 111 is raised to an uppermost position, the tray 140 attached to the rod 143 of a piston and cylinder 142 may be moved beneath the emission end of the lance assembly 110 so that any excess liquid dripping from the lance may be collected within the disposable container.

Referring now again to FIG. 1, it will be noticed that an extension arm 160 is attached to the end of arm 33. Mounted on the end of the extension arm 160 is a control assembly 161 which includes a programmable microprocessor and various control buttons for initiating or terminating certain events of operation. It will also be noted that handles 162 and 163 are provided on opposite sides of the control console 161 for gripping by the operator of the apparatus. The extension arm 160 is telescopically and pivotly attached to the end of the arm 33 allowing the extension arm 160 to be adjusted, in or out and up or down, to accommodate the operator.

All of the motors and actuators of the apparatus e.g., ram 32, motors 80 and 80a, valve actuators 102, 103, 102a, 103a, 119, 119a, piston and cylinder 131, disc brake actuators, etc. are operatively connected to a source of power. In the exemplary embodiment, the source of power is air. All these elements are also operatively connected to the control console 161 allowing initiation and termination of certain events from the control panel 161. Specifically, the disc brake actuators are operatively connected to moveable elements at the handles 162 and 163. With these elements the operator can release the disc brakes to allow certain movements of subassemblies of the apparatus. For example, releasing the brakes allows the horizontal arm assembly 11 to pivot about the vertical axis of pivot 34 and allows the horizontal carriage assembly 36 on which vertical mast assemblies 12, 13 are supported to move in or out on the arm 33. This allows a particular vertical mast assembly 12, 13 and the lance associated therewith to be positioned above the opening of the drum or container to be filled thereby. When the elements on the handles 162 and 163 are released, the disc brake actuators are actuated causing the disc brakes to be engaged, preventing movement of the subassemblies from that position. In addition, the ram 32 allows up and down movement of the entire apparatus so that it may initially be positioned just above the containers to be filled whether they are 55 gallon drums or 5 gallon pails.

The method of operating the apparatus of the present invention will now be described with reference to all the drawings. First, one of the lance assemblies, 110 in the described embodiment, is positioned above an opening in one of the containers e.g., drum 1. Actually, at this point the lance assembly 110 would be up, like the lance 110a as shown in FIG. 1. The lance control valve 114 and at least one of the first and second control valves 102, 103 is in closed positions.

Next, the tubular member 111 of lance assembly 110 is lowered into the container 1 to a predetermined position (as shown in FIG. 1) just above the bottom of the container. Lowering of the lance assembly 110 is accomplished or affected through operation of air motor gear reducer 80 which drives sprocket 74 and the intermediate sprocket 78 causing the chain 85 to move the mast carriage 60, valves 102, 103 and the lance 110 in a downward direction toward the predetermined position just above the bottom of the container 1. The position of the lance 110 is sensed by the sensor 79 which counts the number of holes or other indicia on the disc 75 as it rotates with gear 74 and the shaft 71 to which it is attached.

At this point, one of the first and second control valves 102, 103 may be partially opened and the other first and second control valve 102 or 103 and the third control valve or lance foot valve 114 may be fully opened to introduce liquid into container 1 at a dribble rate until the lower end of the tubular lance member 111 is submerged below the surface of the liquid in the container. Alternatively, all three of these control valves 102, 103 and the lance control valve 114 may be fully opened introducing liquid into the container at a fast fill rate.

In either of the above cases, as soon as the lower end of the lance has been submerged beneath the surface of the liquid, all three valves are fully opened so that liquid flows into the container at a fast fill rate. At this moment, a signal is sent to the air motor gear reducer 80, causing it to reverse rotation and simultaneously raise the lance 110 with its lower end submerged just below the surface of the liquid, until a predetermined weight of liquid is in the container e.g., 90% of the completely filled or target weight. This weight is sensed by the weight measuring apparatus on which the containers rest.

As soon as the predetermined weight is reached, one of the first and second control valves 102, 103 is partially closed (or partially open), the liquid continuing to flow into the container but at a slower or dribble fill rate. As soon as the predetermined target weight of liquid within the container is reached, at least one of the first and second control valves 102, 103 is closed to terminate flow from the source of liquid. The third control valve or the lance valve is also closed, preferably after a short time delay.

Then the mast carriage 60, the control valves 102, 103 attached thereto and the lance assembly 110 are raised a short distance until the tubular lance member 111 is completely withdrawn from the container 1. As this occurs, a wiper ring surrounding the upper opening or hole in the fume housing 130 wipes any excess liquids remaining on the lance so that it flows or drips, first into the container from which it has withdrawn. As soon as the lower end of the tubular lance member 111 has been sufficiently raised, the collection tray 140 by operation of actuator 142 moves beneath the emission end of the lance to collect any excess liquid dripping from the lance. The emission end of the lance assembly 110 is above the tray 140 but still engages the upper hole of the fume housing 130. The tray 140 holds a disposable receptacle or container 141 and before it is completely filled, the fume housing 130 may be opened at 144 for removal of the disposable container 141 and replacement with a fresh one. It can also be removed from the front by opening the end of housing 130. As also mentioned, the end of the fume housing also allows removal and replacement of the lance assembly 110 without having to raise the tubular member 111 any further. If it is necessary to replace any parts of the fume assembly, screws 132–135 may be removed and the entire assembly removed for replacement or repair.

After these steps are completed, the subassemblies supporting the lance 110 may be repositioned to fill another container. After all the containers on the pallet 5 have been filled, the pallet is moved by the conveyor 6 for further handling or storage.

The exemplary embodiment of the apparatus and the method of use thereof just described is one having a double vertical mast, valves and lance assembly. As previously stated, this allows the same apparatus to be used for two different or incompatible products. One can be dispensed through lance 110 and the other through the lance 110a. Of course, the apparatus could be made with a single vertical mast assembly and lance 110 if desired.

The exemplary embodiment of the apparatus A of the present invention has been described for use in filling containers on a pallet. The horizontal arm carriage 36, arm 33 and its pivotal attachment to the pivot assembly 30 allows one lance e.g., 110 to be positioned over any of the containers on the pallet. Obviously, the apparatus could be more simply designed so that the vertical mast assembly 12 is maintained in a fixed position for filling of one container after another, all containers being positioned beneath a single lance and in proper registration therewith. Such a version would not require a horizontally moving carriage or a pivoting arm.

Thus, the embodiment of the liquid filling apparatus and the method of using such described with reference to FIGS. 1–5 is an exemplary embodiment. Many alterations and variations thereof may be made without departing from the spirit of the invention. Accordingly, it is intended that the scope of the invention be limited only by the claims which follow.

What is claimed is:

1. Apparatus for filling containers with liquid of the type having a tubular filling lance operatively connected to a source of liquid and being vertically movable between raised and lowered positions, raising and lowering of said lance being controlled so that the lower emission end of said lance is disposed just below the surface of liquid in said container as said container is being filled through said lance, said apparatus comprising the following improvements:

a first control valve in fluid communication with said source of liquid, said first control valve including an actuator for moving said first control valve between a fully opened position and a partially opened position;

a second control valve disposed between said first control valve and said tubular filling lance said second control valve including an actuator for moving said second control valve between a fully opened position and a completely closed position;

weight measuring means for real time measurement of the weight of liquids placed in a container through said tubular filling lance; and control means operatively connected to said weight measuring means and each actuator of said first and second control valves for controlling the movement of said first and second control valves and the flow of liquids through said tubular filling lance into said container in response to predetermined weight of liquids in said container.

2. Container filling apparatus as set forth in claim 1 in which said control means positions each actuator of said first and second control valves for three different rates of flow; fast fill, slow fill and no fill; both of said control valves being fully opened during fast fill, said first control valve being partially opened and said second control valve being fully opened during slow fill, at least one of said first and second control valve being completely closed during no fill.

3. Container filling apparatus as set forth in claim 2 including a third control valve attached to said emission end of tubular filling lance, said third control valve including an actuator for moving said control valve between an opened position and a closed position.

4. Container filling apparatus as set forth in claim 3 in which said control means is also operatively connected to the actuator of said third control valve, positioning said actuator to open said third control valve during fast and slow fill rates of flow and to close said third control valve during no fill.

5. Container filling apparatus as set forth in claim 4, in which said control means includes a time delay device which, upon closing of at least one of said first and second control valves, allows said third control valve to close after a short time delay.

6. Container filling apparatus as set forth in claim 1 including a vertical mast and a mast carriage assembly attached to said mast for up and down movement thereon, said filling lance being operatively attached to said mast carriage assembly for movement of said filling lance between said raised and lowered positions.

7. Container filling apparatus as set forth in claim 6 including motor operated means mounted on said mast and operatively connected to said control means and said mast carriage assembly for moving said filling lance between said raised and lowered positions in response to signals from said control means.

8. Container filling apparatus as set forth in claim 7 including a rotatable plate operatively associated with said motor operated means, said plate having indicia thereon delectable by a sensor which is connected to said control means to indicate vertical positions of said filling lance.

9. Container filling apparatus as set forth in claim 8 in which said rotatable plate comprises a portion of a disc brake assembly, said disc brake assembly comprising a brake actuator operatively connected to said control means, said brake actuator being engageable with said rotatable plate in response to signals from said control means to stop and prevent up and down movement of said mast carriage assembly and said filling lance.

10. Container filling apparatus as set forth in claim 6 including a horizontal arm and an arm carriage assembly attached to said arm for horizontal movement thereon, said vertical mast being attached to said arm carriage assembly to permit horizontal movement of said vertical mast and said filling lance along said arm.

11. Container filling apparatus as set forth in claim 10 in which a distal end of said arm is attached by a pivot assembly to support means, said pivot assembly allowing said arm to pivot about a vertical axis for radial movement of said mast, said mast carriage assembly and said filling lance about said vertical axis.

12. Container filling apparatus as set forth in claim 11 in which said pivot assembly includes a disc brake comprising a disc attached to one of said arm and said support means and a brake actuator attached to the other, said brake actuator being operatively connected to said control means and engageable with said disc in response to signals from said control means to stop and prevent radial movement of said arm about said vertical axis.

13. Container filling apparatus as set forth in claim 11 in which said pivot assembly is operatively attached to said support means for vertical movement thereon allowing said arm, said mast and said filling lance to be simultaneously raised or lowered.

14. Apparatus for filling containers with liquid of the type having a tubular filling lance operatively connected to a source of liquid and being vertically moveable between raised and lowered positions, raising and lowering of said lance being controlled so that the lower emission end of said lance is disposed just below the surface of liquid in said container as said container is being filled through said lance, said apparatus comprising the following improvements:

one or more control valves providing fluid communication between said lance and a source of liquid;

a lance control valve attached to said emission end of said lance including an actuator for moving said lance control valve between opened and closed positions;

weight measuring means for real time measurement of liquid placed in a container through said lance;

control means operatively connected to said weight measuring means, said one or more control valves and said lance control valve for permitting or preventing flow of liquids from said source of liquid through said filling lance in response to predetermined weight of liquids received by said container; and a vertical mast and a mast carriage for vertical up and down movement thereon, said lance being attached to said mast carriage and said mast carriage being operatively connected to said control means for controlled raising and lowering of said lance between lower and upper terminal positions in response to weight of liquids in said container;

said apparatus being further characterized by a fume housing for positioning above the fill opening of said container, said housing having a vertical opening therethrough through which said lance may be lowered into and raised from said container and having one or more apertures through which fumes from liquids flowing into said container may be drawn for proper disposal, a drip pan being carried in said fume housing and retracted therein away from said lance as said lance is being lowered into or raised from said container, said drip pan being connected to an actuator which is operatively connected to said control means to move said drip pan beneath the emission end of said lance only when said lance in said upper and closed terminal position to receive any liquids dripping from said lance.

15. Container filling apparatus as set forth in claim 14 including a disposable pan carried within said drip pan for receiving said dripping liquids.

16. Container filling apparatus as set forth in claim 14 in which an end portion of said fume housing is selectively moveable to allow said lance to be transversely displaced without having to move said emission end of said lance above said fume housing.

17. Container filling apparatus as set forth in claim 14 in which said fume housing is removably attached to said apparatus, allowing removal and replacement of said fume housing and said drip pan without disturbing other components of said apparatus.

18. A method of filling a container with a predetermined weight of liquid with apparatus of the type having a tubular filling lance operatively connected to a source of liquid through first and second control valves and being vertically moveable between raised and lowered positions, said method comprising the stops of:

positioning said lance above an opening in said container, said lance being provided with a third control valve in a closed position, at least one of said first and second control valves being in closed position;

lowering said lance into said container to a predetermined position just above the bottom of said container;

fully opening said first, second and third control valves to introduce liquid into said container at a fast fill rate while simultaneously raising said lance, with its lower end submerged below the surface of said liquid, until a first predetermined weight of liquid is in said container;

partially closing one of said first and second control valves and continuing to introduce liquid into said container at a dribble fill rate until a second predetermined weight of liquid within said container is reached;

completely closing at least one of said first and second control valves to terminate flow from said source of liquid; and closing said third control valve and raising said lance for complete withdrawal from said container.

19. The method of filling a container as set forth in claim 18 in which said closing of said third control valve is initiated a short time delay after said complete closing of at least one of said first and second control valves.

20. The method of filling a container as set forth in claim 18 in which said partial closing of one of said first and second control valves is effected by said first control valve and said complete closing by said second control valve.

21. The method of filling a container as set forth in claim 18 including the further step of:

moving a collection tray beneath the emission end of said lance to collect any excess liquid dripping from said lance.

22. A method of filling a container with a predetermined weight of liquid with apparatus of the type having a tubular filling lance operatively connected to a source of liquid through first and second control valves and being vertically moveable between raised and lowered positions, said method comprising the steps of:

positioning said lance above an opening in said container, said lance being provided with a third control valve in a closed position, at least one of said first and second control valves being in closed position;

lowering said lance into said container to a predetermined position just above the bottom of said container;

partially opening one of said first and second control valves, fully opening said third control valve and the other of said first and second control valves to introduce liquid into said container at a dribble rate until the lower end of said lance is submerged below the surface of said liquid;

fully opening the previously partially opened one of said first and second control valves and continuing to introduce liquid into said container at a fast fill rate while simultaneously raising said lance, with said lower end of said lance remaining submerged below said surface of said liquid, until a first predetermined weight of liquid is in said container;

partially closing one of said first and second control valves and continuing to introduce liquid into said container at a dribble fill rate until a second predetermined target weight of liquid within said container is reached;

completely closing at least one of said first and second control valves to terminate flow from said source of liquid; and closing said third control valve and raising said lance for complete withdrawal from said container.

23. The method of filling a container as set forth in claim 22 in which said closing of said third control valve is initiated a short time delay after said complete closing of at least one of said first and second control valves.

24. The method of filling a container as set forth in claim 22 in which said partial closing of one of said first and second control valves is effected by said first control valve and said complete closing by said second control valve.

25. The method of filling a container as set forth in claim 22 including the further step of:

moving a collection tray beneath the emission end of said lance to collect any excess liquid dripping from said lance.

* * * * *